US006639172B1

(12) United States Patent
Goto et al.

(10) Patent No.: US 6,639,172 B1
(45) Date of Patent: Oct. 28, 2003

(54) METHOD OF AND APPARATUS FOR WIRE ELECTRIC DISCHARGE MACHINING CAPABLE OF MACHINING THE MACHINING SUBJECT COARSELY IN A DIELECTRIC FLUID AND FINELY IN A GASEOUS ENVIRONMENT

(75) Inventors: Akihiro Goto, Tokyo (JP); Toshio Moro, Tokyo (JP); Seiji Satou, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/048,571
(22) PCT Filed: Jun. 28, 2000
(86) PCT No.: PCT/JP00/04254
   § 371 (c)(1),
   (2), (4) Date: Feb. 4, 2002
(87) PCT Pub. No.: WO02/00384
   PCT Pub. Date: Jan. 3, 2002

(51) Int. Cl.[7] .......................... B23H 1/00; B23H 1/08; B23H 1/10; B23H 7/02
(52) U.S. Cl. ............................... 219/69.12; 219/69.14
(58) Field of Search ........................ 219/69.12, 69.14

(56) References Cited
U.S. PATENT DOCUMENTS 2,427,588 A * 9/1947 Burnett
5,041,984 A * 8/1991 Watanabe ................ 219/69.12
6,130,395 A * 10/2000 Kaneko et al. ............ 219/69.12
6,344,624 B1 * 2/2002 Moro et al. ............... 219/69.12

FOREIGN PATENT DOCUMENTS

JP  5-329655 A  * 12/1993
JP  6-108249 A  *  4/1994
JP  9-239622 A     9/1997

OTHER PUBLICATIONS

Kikai Gijutsu, vol. 48, No. 5, May 2000 (Tokyo) Masanori Kunieda, "Houden Kakou ni Break Through wo motarasu Gijutsu Doukou", pp. 18–22, especially, pp. 21–22.
Micro–machining by EDM in the gas National Conference lecture papers of Japan Society of Electrical–Machining Engineers, 1996, pp. 77–80.
"Improvement in Accuracy of Second–Cut Using Dry WEDM" Nikkan Kogyo Newspaper, Jul. 1999, pp. 154–155.
"Effect of Supplying the Mist in Second–Cut Using Dry WEDM" Academic lecture meeting papers of Japan Society for Precision Engineering, 1999, p. 415.

* cited by examiner

Primary Examiner—Geoffrey S. Evans
(74) Attorney, Agent, or Firm—Sughrue Mion, PLLC

(57) ABSTRACT

The wire electric discharge machining apparatus includes apparatus or generating a discharge in a gap between a wire electrode (1a) and a machining subject (2) to machine the machining subject. A gas supplying unit (8) supplies a pressurized gas in the gap between the wire electrode and the machining subject. This wire electric discharge machining apparatus has a high productivity, and it is suitable for high-precision machining.

4 Claims, 8 Drawing Sheets (a)

(b)

(a)

(b)

METHOD OF AND APPARATUS FOR WIRE ELECTRIC DISCHARGE MACHINING CAPABLE OF MACHINING THE MACHINING SUBJECT COARSELY IN A DIELECTRIC FLUID AND FINELY IN A GASEOUS ENVIRONMENT

TECHNICAL FIELD

The present invention relates to a method of and an apparatus for wire electric discharge machining in which an electric discharge is generated in a gap between a wire electrode and a machining subject to machine the machining subject.

BACKGROUND ART

The electric discharge machining has become an indispensable technique as a machining technique for metal molds, etc., and has been widely used in the field of the metal mold machining in the automobile industry, electric appliance industry, semiconductor industry, and other industries.

FIG. 6 is an explanatory drawing that shows the mechanism of the electric discharge machining, and in this Figure, reference numeral 1 is an electrode, 2 is a machining subject, 3 is an arc column, 4 is a dielectric fluid, and 5 is machining dusts generated by an electric discharge machining process. The machining subject 2 is machined while the following cycle of processes (a) to (e) (corresponding to (a) to (e) in FIG. 6) are repeated. Specifically, these processes include (a) a formation of an arc column 3 by the generation of a discharge, (b) a local fusing process and evaporation of the dielectric fluid due to the thermal energy from the discharge, (c) generation of evaporation explosion force of the dielectric fluid 4, (d) scattering of fused portions (machining dusts 5) and (e) cooling process, solidifying process and insulation-recovering process between electrodes through 9 the dielectric fluid.

Among electric discharge machining processes, this invention particularly relates to boring process, cutting process and the like. With respect to the wire electric discharge machining, there have been strong demands for high precision, and, for example, in the machining process for high-precision metal molds used in the semiconductor industry, etc., there has been a demand for a high machining precision of approximately 1 to 2 μm.

FIG. 7 includes drawings for explaining an example of the machining processes involved in the conventional wire discharge machining operation. In FIG. 7, reference numeral 1a is a wire electrode, 2 is a machining subject, 4a is water, which is a dielectric fluid, 6 is an initial hole. FIG. 7(a) represents a first cut that corresponds to a coarse machining process, FIG. 7(b) represents a second cut that corresponds to an intermediate finish machining process after the coarse machining process, and FIG. 7(c) represents a third cut that corresponds to a final finish machining process.

In the first cut machining example of FIG. 7(a), the wire electrode 1a is inserted through the initial hole 6 so as to carry out a boring process through the machining subject 2. In the case of the first cut of this type, strict surface roughness and precision are not required since the surface roughness and precision are finished in the succeeding processes, and in particular, it is essential to increase the processing speed so as to improve the productivity. In order to increase the processing speed in the wire electric discharge machining operation, water 4a is strongly discharged to the gap between electrodes so as to effectively remove the machining dusts from the gap between electrodes. Moreover, in order to eliminate irregularity in discharged water 4a to the gap between electrodes and also to prevent disconnection of the wire electrode 1a, a method is adopted in which a processing vessel not shown is filled with water 4a in which the machining subject 2 is immersed.

The processes of the second cut ((b) in FIG. 7) and the third cut ((c) in FIG. 7) after the first cut ((a) in FIG. 7) are also carried out in water 4a that is a dielectric fluid.

FIG. 8 shows one example of a voltage and a current waveform of the gap between electrodes. In FIG. 8, V represents a voltage between electrodes, I represents a current between electrodes and represents time. A timing T1, a voltage is applied between the wire electrode 1a and the machining subject 2. When the voltage is applied, an attracting electrostatic force is exerted between the positive electrode and the negative electrode so that the wire electrode 1a having a smaller rigidity is pulled toward the machining subject 2 by the electrostatic force. The wire electrode 1a starts vibrating because of such attraction, and it becomes very difficult to carrying out machining process at high precision because of the vibrating electrode.

At timing T2, the discharging energy generates a vaporization explosion force in the dielectric fluid (for example, see (c) in FIG. 6), a greater force is exerted on the wire electrode 1a by the vaporization explosion force of the dielectric fluid in a direction opposite to the machining subject 2, resulting in generation of vibrations. Such vibrations cause irregularities in the shape of the machining subject 2, resulting in degradation in precision.

Wire electric discharge machining is commonly employed in the process of manufacture of semiconductor devices. For example, the wire electric discharge machining is commonly employed in the case of the machining process for metal molds for IC lead frames. There have been demands for extremely high precision in the wire electric discharge machining and smooth surface roughness, such as 1 μm in shape precision and not more than 1 μmRmax in surface roughness, and an increase in applications requiring high productivity. In light of this demand, generation of vibration in the electrode is quite disadvantageous.

With respect to methods for solving such problems with the wire electric discharge machining in a solution, a technique relating to an air wire electric discharge machining that carries out a wire electric discharge machining process without interpolating a dielectric fluid between electrodes has been disclosed ("Improvement of Accuracy of Second-Cut using Dry WEDM", Adachi, et al. Tokyo University of Agriculture and Technology, p154, Molding Technique, Vol. 14, 7th issue, 1999, Nikkan Kogyo Newspaper) This technique has disclosed that a wire electric discharge machining process in the air makes it possible to improve the precision in straightness in the machining subject cut surface. Therefore, the achievement is great from the viewpoint of providing high precision; however, the processing rate is as slow as approximately 1/10 of the machining in a solution, resulting in a problem with practical use due to low productivity. Moreover, this technique has disclosed nothing about means for applications requiring higher precision or applications requiring high quality in the surface of the machining subject.

DISCLOSURE OF THE INVENTION

The present invention has been achieved to solve the above-mentioned problems. It is an object of this invention to provide a method of and apparatus for wire electric discharge machining that are suitable for high-precision machining with high productivity. Moreover, another objective is to provide a method of and apparatus for wire electric discharge machining that are suitable for high-quality machining.

The wire electric discharge machining method according to one aspect of this invention comprises generating an electric discharge in a gap between a wire electrode and a machining subject to thereby machine the machining subject, and supplying a pressurized gas in the gap between the wire electrode and the machining subject while the machining subject is being machined.

The wire electric discharge machining method according to another aspect of this invention comprises generating an electric discharge in a gap between a wire electrode and a machining subject to there by machine the machining subject, coarsely processing the machining subject in an environment of a dielectric fluid, finely processing the machining subject in a gaseous environment while supplying a pressurized gas in a gap between the wire electrode and the machining subject.

In the above-mentioned wire electric discharge machining method, the gas is at least one kind selected from the group consisting of oxygen, nitrogen, hydrogen, an inert gas and an insulating gas.

The wire electric discharge machining apparatus according to still another aspect of this invention comprises a discharge unit which generates an electric discharge in a gap between a wire electrode and a machining subject to thereby machine the machining subject, a gas supplying unit which supplies a pressurized gas in a gap between the wire electrode and the machining subject.

The wire electric discharge machining apparatus according to still another aspect of this invention comprises a discharge unit which generates an electric discharge in a gap between a wire electrode and a machining subject to thereby machine the machining subject, a dielectric fluid supplying unit which supplies a pressurized dielectric fluid in the gap between the wire electrode and the machining subject, and a gas supplying unit which supplies a pressurized gas in the gap between the wire electrode and the machining subject.

The above-mentioned wire electric discharge machining apparatus further comprises a switching unit which supplies a pressurized fluid into a nozzle and for switching this pressurized fluid to the dielectric fluid or the gas is provided so as to constitute the above-mentioned dielectric fluid supplying unit and the gas supplying unit.

In the above-mentioned wire electric discharge machining apparatus, the gas is at least one kind selected from the group consisting of oxygen, nitrogen, hydrogen, an inert gas and an insulating gas.

BEST MODE FOR CARRYING OUT THE INVENTION

Figure 1:
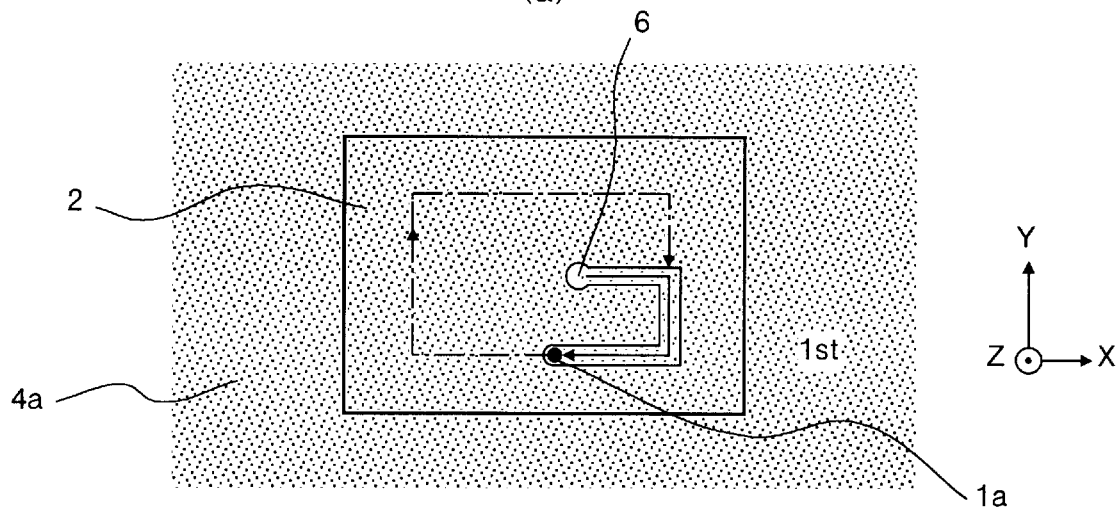
FIG. 1 is an explanatory drawing that shows one example of a wire electric discharge machining method in accordance with one embodiment of the present invention.
Figure 1:
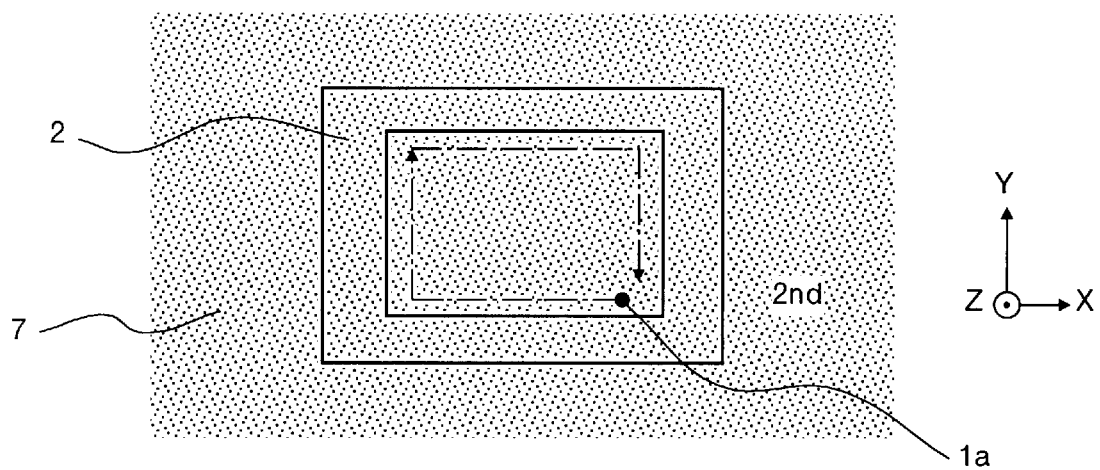

FIG. 1 includes drawing for explaining a wire electric discharge machining method in accordance with one embodiment of the present invention. In FIGS. 1(a) and 1(b), reference numeral 1a represents a wire electrode, 2 is a machining subject, 4a is water that is a dielectric fluid, 6 is an initial hole, and 7 is a gas such as air. FIG. 1(a) shows a first cut that is a coarse machining process, and FIG. 1(b) shows a second cut that is a finishing process that is carried out after the coarse machining process. These names, the first cut and the second cut, are used for convenience of explanation, and the wire electric discharge processing is not necessarily finished in these two machining processes. If a high precision is required, the machining processes are sometimes carried out as many as 7 times or 8 times.

Figure 7:
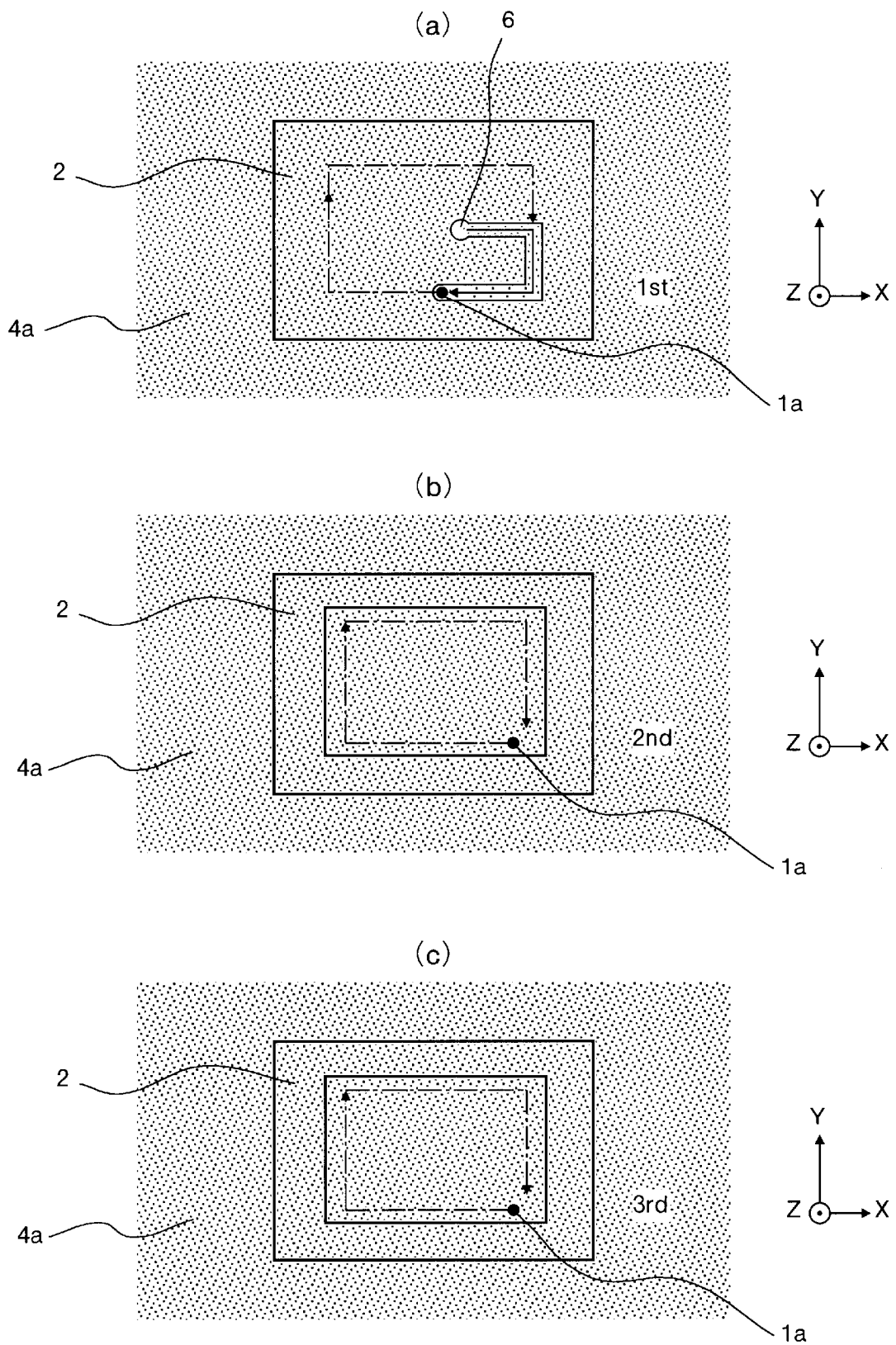
FIG. 7 is an explanatory drawing that shows an example of machining processes in a wire electric discharge machining.
Figure 8:
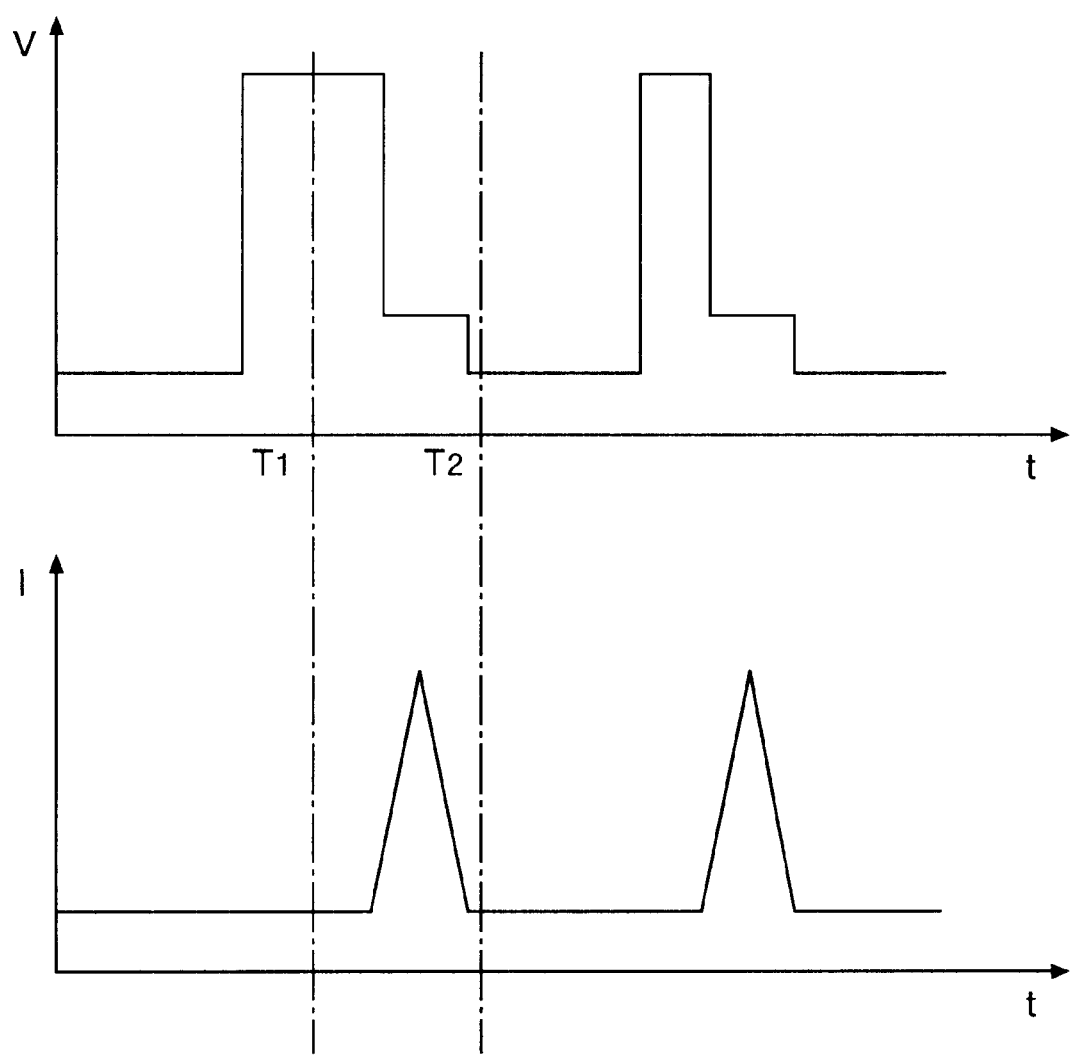
FIG. 8 is a drawing that shows one example of a voltage between electrodes and a current waveform.

How the machining is carried out will be explained now. The first cut, shown in FIG. 1(a), is a boring process in a machining subject 2 by allowing the wire electrode 1a to pass through the initial hole 6. In the case of the first cut, strict surface roughness and precision are not required since the surface roughness and precision are finished in the succeeding processes, and in particular, it is essential to increase the processing speed so as to improve the productivity, and in the same manner as FIG. 7 that shows the prior art, water 4a, which is a dielectric fluid, is interpolated between the electrodes, and the machining process is carried out.

In a normal wiring electric discharge machining process, after the first cut, the machining process is also carried out in the dielectric fluid; however, this process is not suitable for high-precision machining since there is a problem with vibration, etc., in the wire electrode 1a as described in the background of the invention. This invention carries out a machining process without interpolating the dielectric fluid between the electrodes so that the precision in shape and the surface roughness of the machining subject are improved.

In the second cut that is a finishing process shown in FIG. 1(b), in order to improve the machining precision while suppressing vibration of the wire electrode 1a, not a machining process in the dielectric fluid 4a, but a machining process in a gas 7 is carried out. The gas wire electric discharge machining process of this type makes it possible to suppress vibration, etc. of the wire electrode 1a, as will be described below.

In other words, an electrostatic force, exerted between the wire electrode 1a and the machining subject 2 when a voltage is applied between the electrodes, is in proportion to the dielectric constant between the electrodes; therefore, when calculated based upon the same electrode-to-electrode distance, in the case when the gas 7 is interpolated between the electrodes, the electrostatic force is one several tenth of the above-mentioned electrostatic force, in comparison with the case in which water 4a is interpolated between the electrodes (for example, the dielectric constant is the smallest in vacuum, and the dielectric constant in water is approximately 80 times that in vacuum). Moreover, the evaporation explosion force caused by the discharge is generated by the solution interpolated between the electrodes; therefore, in the case when only the gas 7 is interpolated between the electrodes, the wire electrode 1a hardly has the influence from the evaporation explosion force. Consequently, it is possible to suppress vibration, etc. of the wire electrode 1a.

As described above, since the gas electric discharge machining process makes it possible to suppress vibration, etc. of the wire electrode 1a, it becomes possible to improve the precision in shape and the surface roughness in the machining subject.

Figure 2:
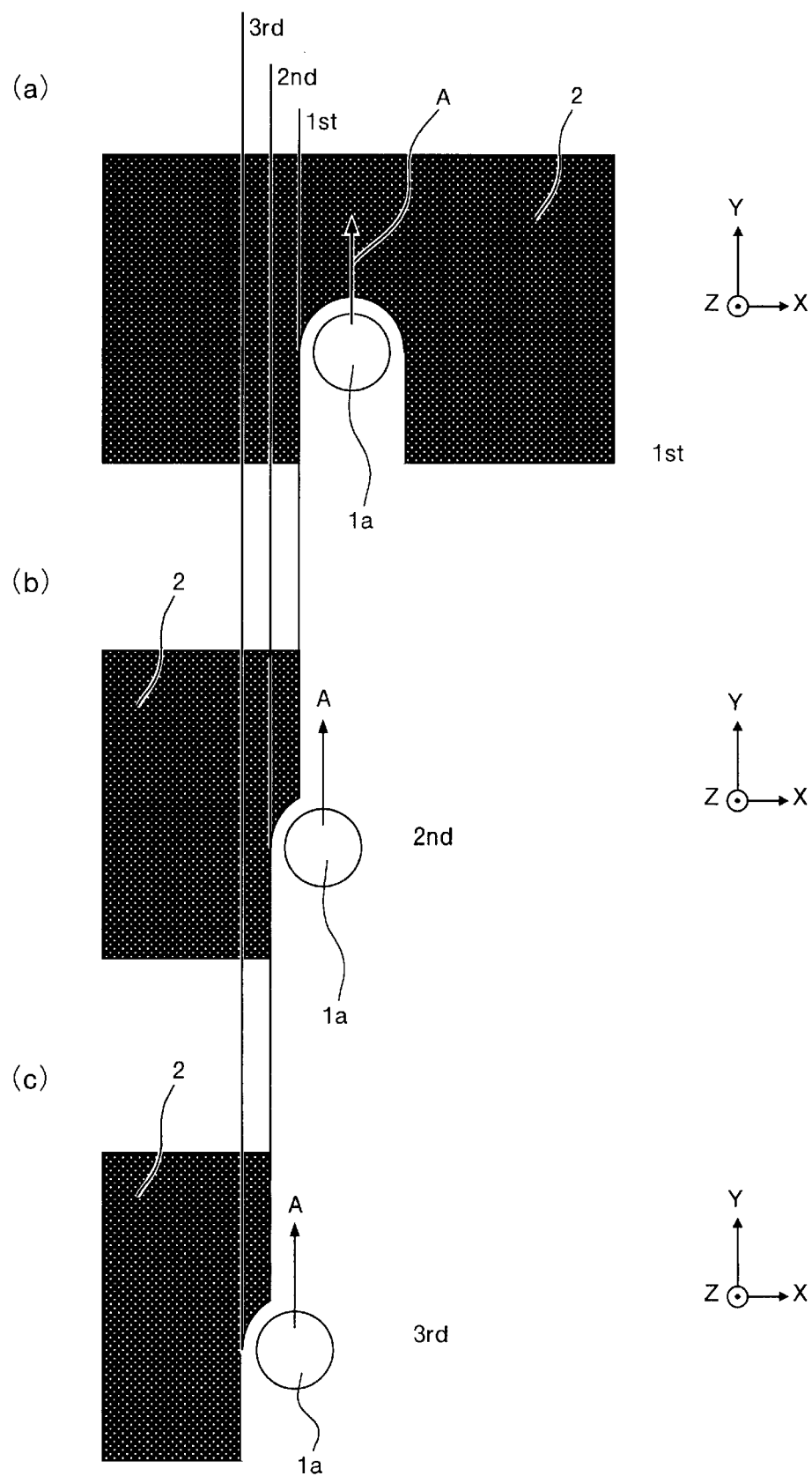
FIG. 2 is an explanatory drawing that shows the shifting amount of a wiring electrode by a wire electric discharge machining process.

Moreover, the gas wire electric discharge has advantages in that the permissible range of the shifting amount of a wire electrode for each machining condition is widened. FIG. 2 includes drawings that explain the concept of a shifting amount (an amount by which the wire electrode is successively shifted toward the machining subject side in accordance with the number of machining processes) of the wire electrode. FIG. 2(a) shows a first cut, FIG. 2(b) shows a second cut, and FIG. 2(c) shows a third cut. In FIGS. 2(a) to 2(c), reference numeral 1a is a wire electrode, 2 is a machining subject, and A represents a machining progressing direction (a relative shifting direction of the wire electrode 1a with respect to the machining subject 2). The shifting amount is a value that is determined by an amount of machining process under a certain machining condition. However, the amount of machining process under a certain machining condition is an amount that varies greatly depending on the feeding rate of the wire electrode, the finishing states under the preceding conditions, etc. For this reason, the machining conditions of the wire electric discharge machining need to be determined by using condition sequences based upon conditions selected from the results of various machining tests carried out on shifting amounts of the wire electrode, feeding rates of the wire electrode, etc., from the coarse machining to finish machining. This means that there is little freedom in machining, and, for example, even if there is a little shortage in the amount of machining and an attempt is made to carry out an additional machining process to finish the dimension, it is difficult to carry out an appropriate machining process.

Figure 3:
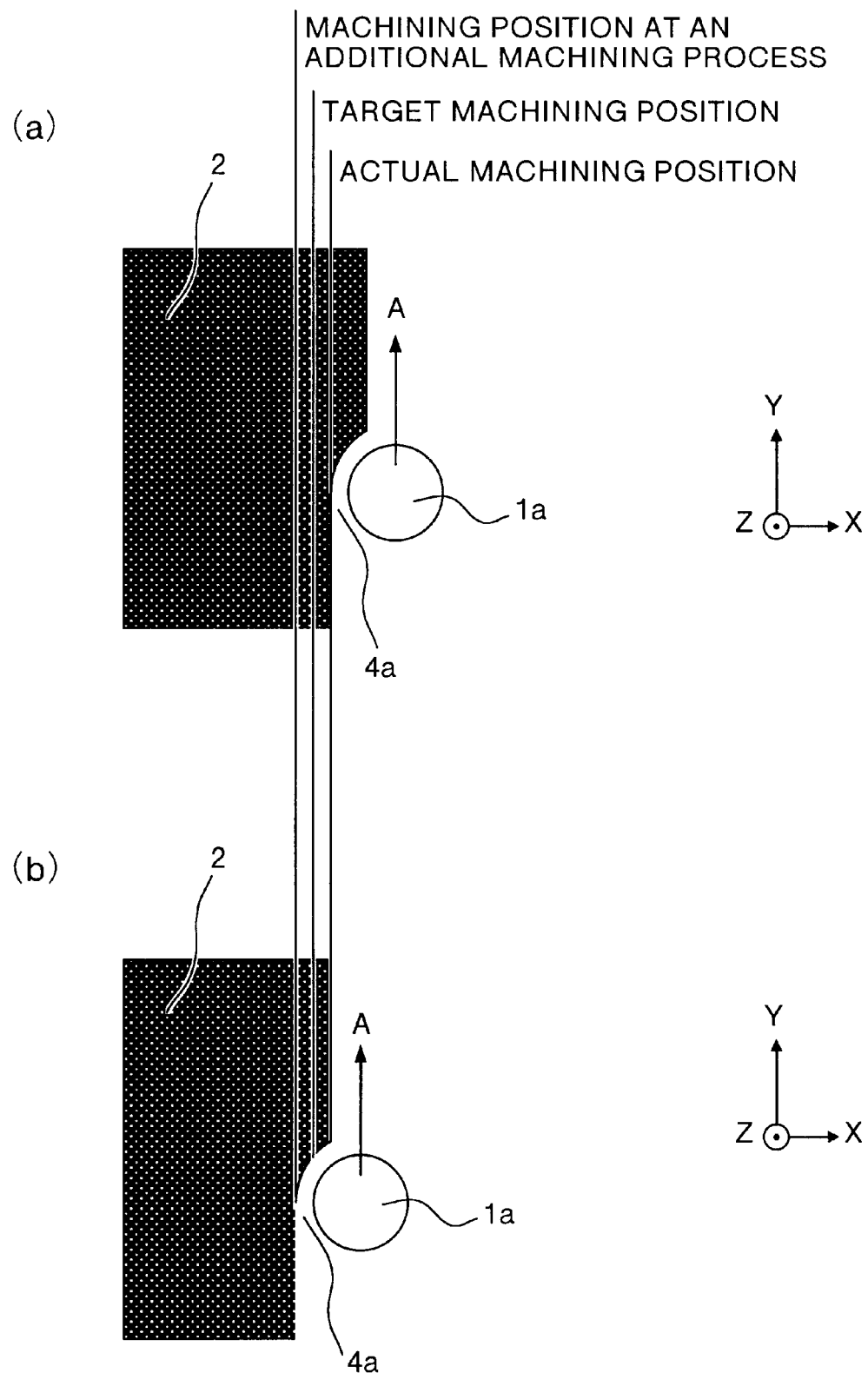
FIG. 3 is an explanatory drawing that shows an example of a wire electric discharge machining process in a dielectric fluid.

FIG. 3 includes drawing that shows an example of a wire electric discharge machining process in a dielectric fluid. In FIGS. 3(a) and 3(b), reference numeral 1a is a wire electrode, 2 is a machining subject, and A is a machining progressing direction. FIG. 3(a) shows a state of machining under the final finishing conditions, and its objective is to machine to a target machining position. However, an example of FIG. 3(a) shows a state in which, different from the target, the actual result of machining fails to take the necessary portion, remaining a small portion. Supposing that a difference between the target machining position and the actual machining position is, for example, 2 $\mu$m, it is normally considered that an additional machining process may be carried out by shifting the wire electrode 1a 2 $\mu$m toward the machining subject 2 side so as to finish to the target machining position; however, in fact, since the state of the machining face at the time of the previous finish machining and the feeding rate, etc. of the wire electrode are different from those of the additional machining, it is difficult to finish with the target dimension in many cases. For example, as shown in FIG. 3(b), there is an offset between the machining position in the additional machining and the target machining position.

Figure 4:
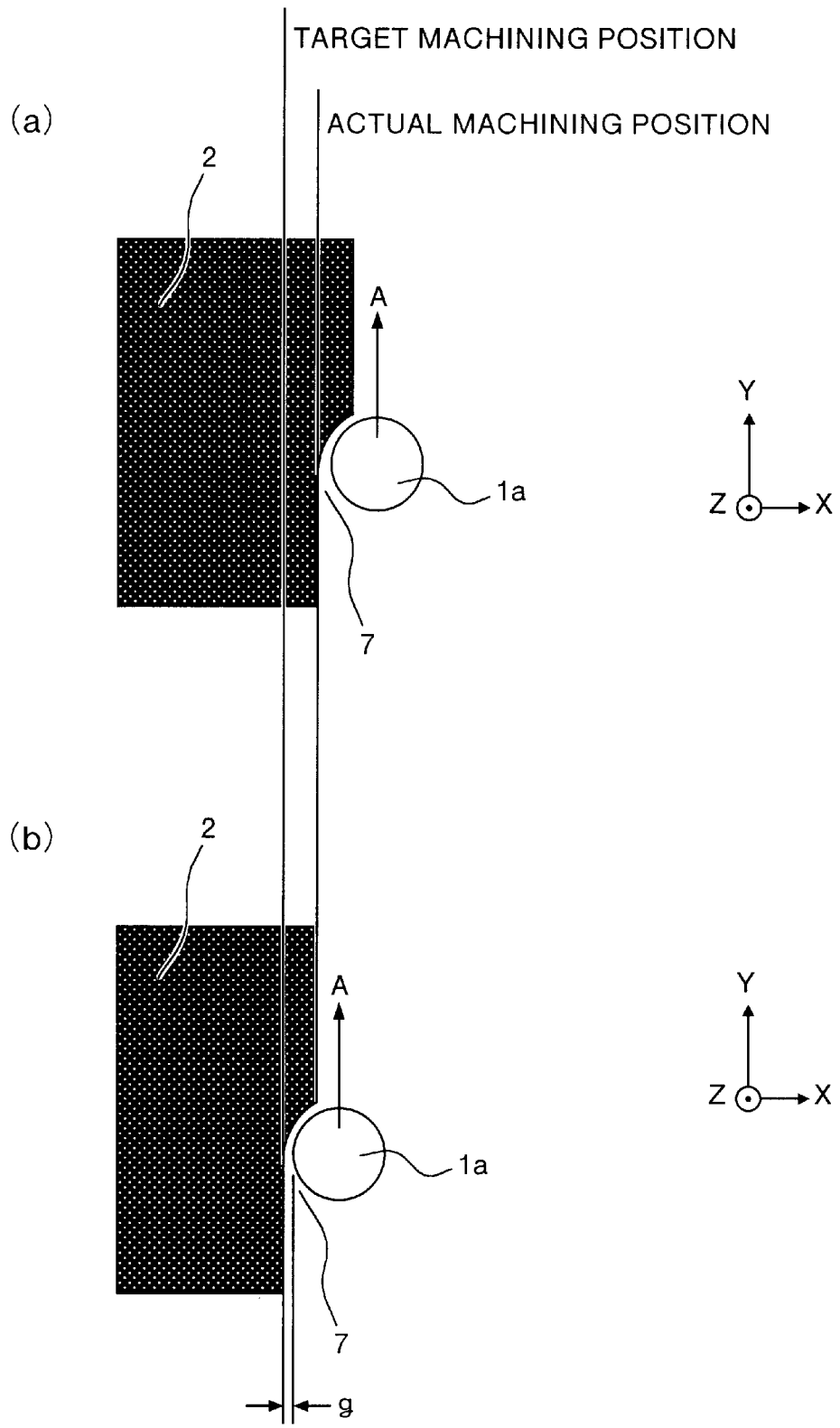
FIG. 4 is an explanatory drawing that shows an example of a wire electric discharge machining process in a gas.

FIG. 4 includes draws that shows an example of a gas wire electric discharge machining process. In FIGS. 4(a) and 4(b), reference numeral 1a is a wire electrode, 2 is a machining subject, and A is a machining progressing direction. In the case when, upon carrying out the same machining process as FIG. 3, an additional machining process as shown in FIG. 4(b) is carried out in a gaseous state, since the discharging gap g is narrow, it is possible to carry out machining at positions closer to the target dimension. In other words, this is suitable for a high-precision machining process. The reason for this is that in order to obtain a machining dimension with high precision, the machining process needs to be carried out under conditions in which factors such as the surface roughness prior to machining, the machining conditions and the shifting rate of the wire electrode are coincided with each other; and errors occurring when these conditions are different become smaller as the discharging gap g is narrowed. This means not only the fact that in a sequence of machining processes from the coarse machining to the finish machining, the machining is carried out to form a target shape, but also the fact that, even when the shape dimension is offset, the correction of the shape is easily carried out by an additional machining process.

As described above, the gas wire electric discharge machining is effective in a high-precision machining process; however, it also has a problem in which as described in the background of the invention, the machining rate is slow as compared with the solution wire electric discharge machining process. The main reason for this is that the removing amount of the machining subject is reduced since, different from the solution electric discharge machining, the evaporation explosion force generated by the discharge is not exerted and that machining dusts removed by the discharge are allowed to adhere to the wire electrode and the surface of the machining subject, making the machining process unstable. Moreover, such an unstable machining process causes degradation in the machining precision of the machining subject.

Figure 5:
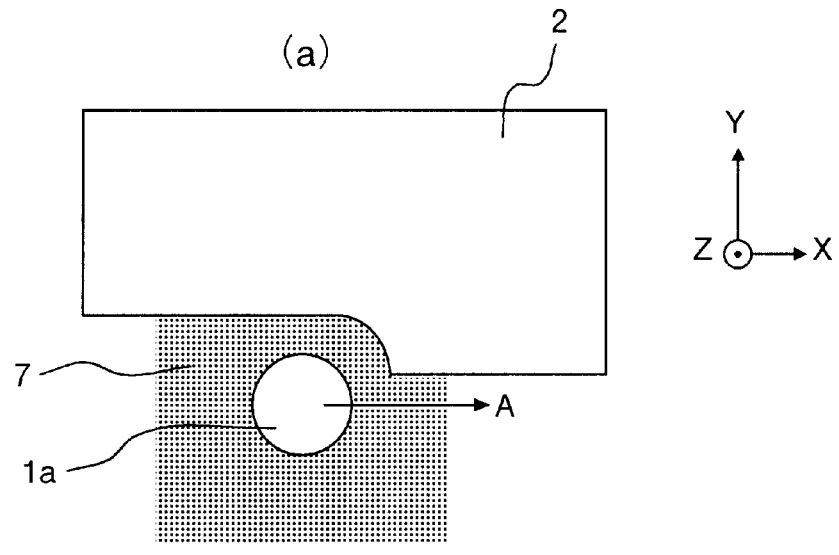
FIG. 5 is a drawing that shows a structural example of a gas supplying unit which supplies a gas in a gap between the electrodes in a wire electric discharge machining apparatus.
Figure 5:
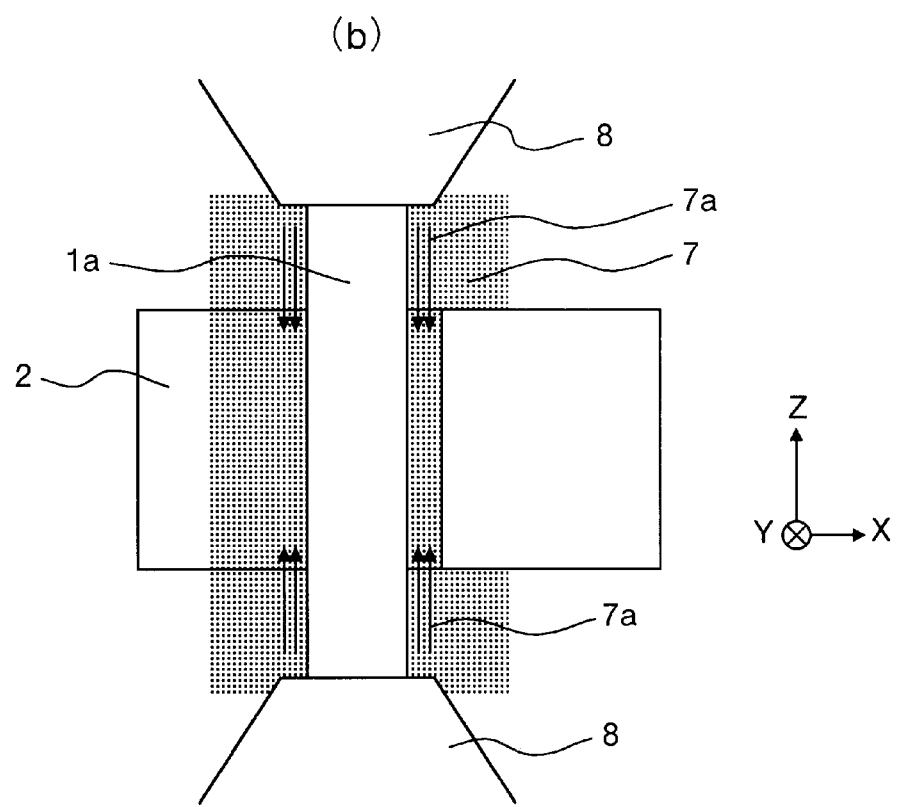
Figure 6:
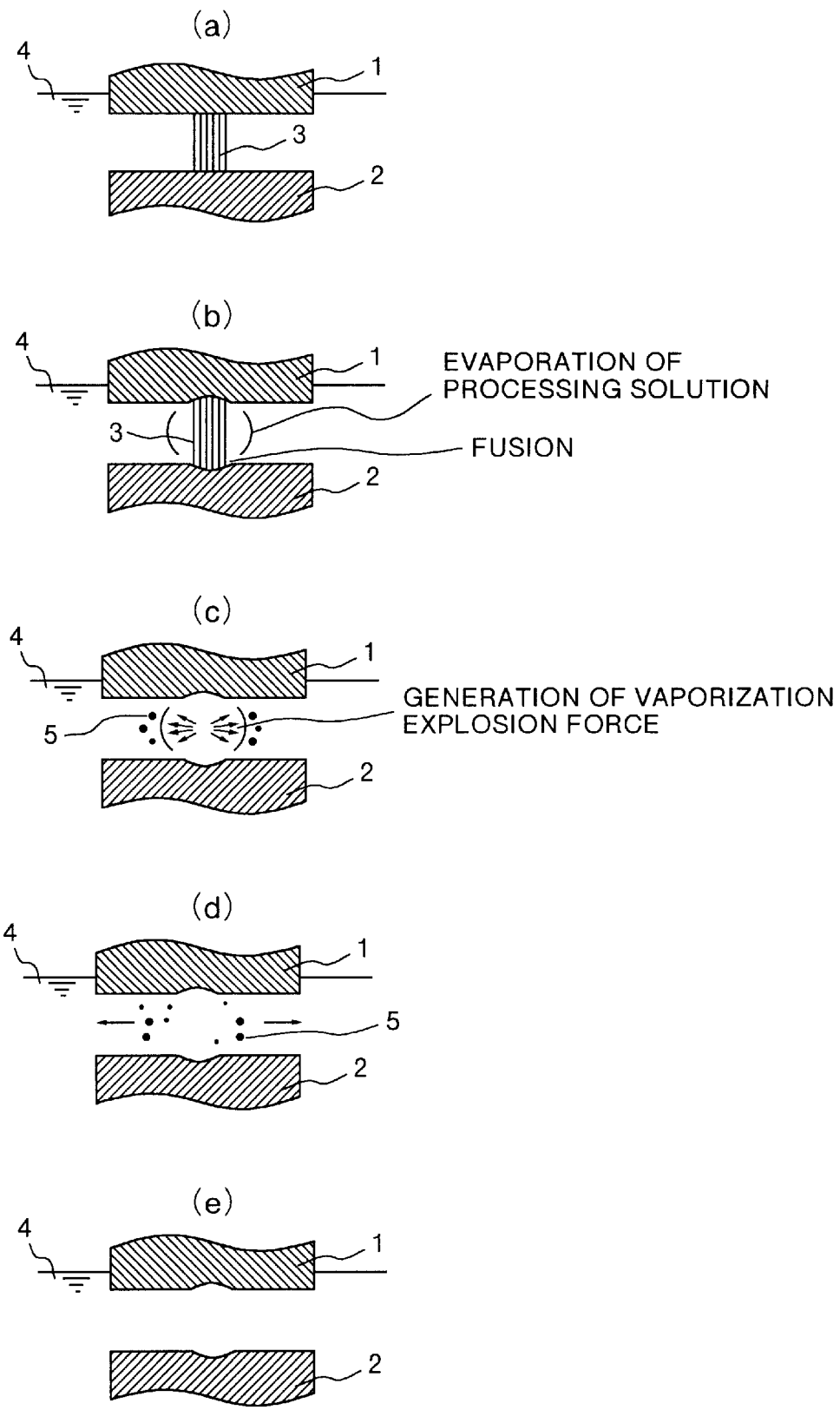
FIG. 6 is an explanatory drawing that shows a mechanism of the electric discharge machining process.

FIG. 5 includes draws that shows a structural example of a gas supplying unit which supplies a pressurized gas in a gap between the electrodes in order to prevent adhesion of the machining dusts. In FIGS. 5(a) and 5(b), reference numeral 1a is a wire electrode, 2 is a machining subject, 7 is a gas, 7a is a gas flow, and 8 is a gas supplying unit. The gas supplying unit 8 supplies gas 7 (gas flow 7a in FIG. 5) from the periphery of the wire electrode 1a toward the gap between the wire electrode 1a and the machining subject 2 (in Z-direction in FIG. 5), and for example, this is realized by forming a nozzle on the periphery of the wire electrode 1a so as to supply a pressurized gas. Such a structure of the gas supplying unit 8 makes it possible to blow off the machining dusts by the pressure of the gas 7. Therefore, it becomes possible to improve the machining rate of the gas wire electric discharge machining and also to prevent the degradation in the machining precision.

Moreover, when the coarse machining is carried out by the solution wire electric discharge machining, while the finish machining is carried out by the gas wire electric discharge machining, the piping is switched by using valves so that the fluid to be supplied through the nozzle formed on the periphery of the wire electrode 1a may be switched to the dielectric fluid or the gas. Thus, it is possible to use the dielectric fluid supplying unit and the gas supplying unit in a switching manner. Such a switching operation between the coarse machining and finish machining makes it possible to carry out the machining process on the machining subject more effectively.

It has been known that in the gas wire electric discharge machining, oxygen gas is used as the gas 7 to be supplied between the electrodes by the gas supplying unit 8 so that the machining rate is approximately doubled in comparison with the machining in the air. This is presumably because the supply of oxygen gas increases the effect of blowing off fused machining subject by the discharge and also allows the discharging energy to be easily absorbed by the machining subject to increase the removing amount of the machining subject. Moreover, by supplying oxygen between the electrodes, a chemical reaction is allowed to take place in plasma caused by the discharge, thereby making it possible to turn carbon or impurities such as sulfur into gases such as $CO_2$ and $SO_2$ so as to be removed.

Moreover, nitrogen gas is used as the gas 7 to be supplied between the electrodes by the gas supplying unit 8 so that it becomes possible to nitride the surface of the machining subject so as to increase the hardness of the surface of the machining subject and also to improve the durability of the machining subject.

Furthermore, when hydrogen gas is used as the gas 7 to be supplied between the electrodes by the gas supplying unit 8, a chemical reaction is allowed to take place in plasma caused by the discharge, thereby making it possible to remove impurities such as oxygen on the surface of the machining subject as $H_2O$.

In the case when an inert gas is used as the gas 7 to be supplied between the electrodes by the gas supplying unit 8, chemical reactions are suppressed in plasma caused by the discharge, thereby making it possible to carry out the removing process without causing any change to the substance on the surface of the machining subject.

Moreover, by using an insulating gas such as $SF_6$ or $CF_4$ as the gas 7 to be supplied between the electrodes by the gas supplying unit 8, it becomes possible to narrow the electrode-to-electrode gap of discharge, and consequently to carry out a machining process with high precision.

INDUSTRIAL APPLICABILITY

As described above, the wire electric discharge machining method of the present invention is suitably used for a discharge machining operation with high precision.

What is claimed is:

1. A wire electric discharge machining method comprising:
   generating an electric discharge into a gap between a wire electrode and a machining subject to thereby machined the machining subject;
   supplying a pressurized fluid into a nozzle;
   switching the pressurized fluid to a dielectric fluid when the machining subject is coarsely processed, and to a gas when the machining subject is finely processed;
   coarsely processing the machining subject in environment of the dielectric fluid; and
   finely processing the machining subject in the gaseous environment while supplying the pressurized gas in the gap between the wire electrode and the machining subject.

2. The wire electric discharge machining method according to claim 1, wherein the gas is at least one kind selected from the group consisting of oxygen, nitrogen, hydrogen, an inert gas and an insulating gas.

3. A wire electrical discharge machining apparatus comprising:
   a discharge unit which generates an electric discharge in a gap between a wire electrode and a machining subject thereby machine the machining subject;
   a dielectric fluid supplying unit which supplies a pressurized dielectric fluid in the gap;
   a gas supplying unit which supplies a pressurized gas in the gap; and
   a switching unit which supplies a pressurized fluid into a nozzle and for switching the pressurized fluid to a dielectric fluid or a gas, wherein
   the switching unit is provided so as to constitute the dielectric fluid supplying unit in the gas supplying unit.

4. The wire electric discharge machining apparatus according to claim 3, wherein the gas is at least one kind selected from the group consisting of oxygen, nitrogen, hydrogen, an inert gas and an insulating gas.

* * * * *

UNITED STATES PATENT AND TRADEMARK OFFICE
CERTIFICATE OF CORRECTION

PATENT NO. : 6,639,172 B1
DATED : October 28, 2003
INVENTOR(S) : Akihiro Goto, Toshio Moro and Seiji Satou It is certified that error appears in the above-identified patent and that said Letters Patent is hereby corrected as shown below:

Column 8,
Line 5, change "machined" to -- machine --
Line 26, before "thereby", add -- to --.

Signed and Sealed this

Seventh Day of September, 2004

JON W. DUDAS
*Director of the United States Patent and Trademark Office*